(12) United States Patent
Bradford et al.

(10) Patent No.: US 7,489,045 B1
(45) Date of Patent: Feb. 10, 2009

(54) ENERGY GENERATING EXPANSION JOINT

(75) Inventors: Paul Bradford, East Amherst, NY (US); Steve Pabst, East Amherst, NY (US)

(73) Assignee: Watson Borman Acme Corporation, Amherst, NY (US)

( * ) Notice: Subject to any disclaimer, the term of this patent is extended or adjusted under 35 U.S.C. 154(b) by 0 days.

(21) Appl. No.: 11/432,159

(22) Filed: May 11, 2006

Related U.S. Application Data

(60) Provisional application No. 60/679,862, filed on May 11, 2005.

(51) Int. Cl.
*F02B 63/04* (2006.01)
*H02K 7/18* (2006.01)

(52) U.S. Cl. ............ 290/1 R; 290/1 A; 290/1 C; 290/45

(58) Field of Classification Search ............ 290/1 R, 290/1 C, 45, 1 A
See application file for complete search history.

(56) References Cited

U.S. PATENT DOCUMENTS

| | | | | |
|---|---|---|---|---|
| 4,053,258 | A * | 10/1977 | Mouille | 416/134 A |
| 5,581,128 | A * | 12/1996 | Royle | 290/4 D |
| 6,045,339 | A | 4/2000 | Berg | |
| 6,188,139 | B1 * | 2/2001 | Thaxton et al. | 290/4 R |
| 6,407,484 | B1 | 6/2002 | Oliver et al. | |
| 6,424,079 | B1 | 7/2002 | Carroll | |
| 6,807,853 | B2 | 10/2004 | Adamson et al. | |
| 6,813,595 | B2 * | 11/2004 | Edgar | 703/8 |
| 7,067,932 | B1 * | 6/2006 | Ghassemi | 290/1 R |
| 7,102,244 | B2 * | 9/2006 | Hunter, Jr. | 290/1 R |
| 7,239,031 | B2 * | 7/2007 | Ricketts | 290/1 R |
| 7,318,578 | B2 * | 1/2008 | Hvidberg et al. | 254/266 |

OTHER PUBLICATIONS

Williams, C. B., Pavic, A., Crouch, R. S. and Woods, R. C. Feasibility Study of Vibration-Electric Generator for Bridge Vibration Sensors, 16th International Modal Analysis Conference (IMAC-XVI)(1997), pp. 1111-1117, Santa Barbara, CA, USA, February.

Amirtharajah, Rajeevan and Chandrakasan, Anantha P., Self-Powered Signal Processing Using Vibration-Based Power Generation, IEEE Journal of Solid-State Circuits, May 1998, pp. 687-695, vol. 33, No. 5, USA.

* cited by examiner

*Primary Examiner*—Darren Schuberg
*Assistant Examiner*—Iraj A Mohandesi
(74) *Attorney, Agent, or Firm*—Curatolo Sidoti Co, LPA; Joseph G. Curatolo; Salvatore A. Sidoti

(57) ABSTRACT

An expansion joint system incorporating means for harvesting kinetic energy and generating electrical energy from the kinetic energy is provided. The incorporation of an energy harvesting and generating means within the expansion joint system actively improves the health, safety, and performance of the system. The electrical energy generator captures a portion of the kinetic energy delivered to the expansion joint via vehicular impacts and converts that kinetic energy to electrical energy for use in a variety of structural health, safety, and performance functions. Various embodiments including an electrical junction box, a cathodic protection system, dampers, and/or data acquisitions systems integrated with the electrical energy generator are also provided. The system generates increases in the overall structural health and reliability indices through the application of the integrated expansion joint electrical energy generator.

29 Claims, 15 Drawing Sheets

FIG. 12

$k_M = 1.400 \times 10^7$   Bearing spring rate, N/m $\delta_M := .001$   Deflection in meters $F_M := \delta_M \cdot k_M$   $F_M = 1.400 \times 10^4$   Force, N $E_M := \frac{1}{2} \cdot k_M \cdot \delta_M^2$   $E_M = 7.005$   Energy, Joules $P_M := 2 \cdot \pi \cdot f \cdot \delta_M \cdot F_M$   $P_M = 3.521 \times 10^3$   Peak power, watts $f := 40$ $\Delta t_p := \frac{1}{2f}$   $\Delta t_p = 0.013$ $\Delta t_{ave} := 3.00$   Vehicle Axle Pulse - Assume 1 truck per 9 seconds, or 3 pulses per 9 seconds $P_{ave} := 0.707 \cdot P_M \cdot \frac{\Delta t_p}{\Delta t_{ave}}$   $P_{ave} = 10.372$   Watts

ENERGY GENERATING EXPANSION JOINT

CROSS REFERENCE TO RELATED APPLICATIONS

This application claims the benefit of the filing date under 35 USC §119(e) of United States Provisional Application for Patent Ser. No. 60/679,862 filed May 11, 2005, which is fully incorporated herein by reference.

TECHNICAL FIELD

Provided are apparatus and process for the harvest, transformation, and subsequent application of energy contained in expansion joints, such as bridge and roadway expansion joints. The apparatus and process relate to harvesting of kinetic energy contained within a bridge, building, or roadway expansion joint due to vehicular impacts, seismic activity, wind, or other events which impart energy of motion to the expansion joint, the conversion of the harvested kinetic energy to electrical energy, and the subsequent application of the electrical energy.

BACKGROUND

To date, much effort has been extended toward managing and improving the health, safety, and performance of bridge structures. Information gathering methods, such as on-site inspections, data acquisition systems, audio and visual monitors, and the like assist in the evaluation of a bridge's structural health and safety. Moreover, corrosion protection, lighting, cleaning, and repair programs are examples of remedial efforts used to promote a bridge structure's health, safety, and performance. A number of these applications, both on the information gathering side and on the remedial side, utilize low amperage power sources. In the past, implementation of structural health and safety applications have be hampered by the lack of availability of a reliable, cost effective, and low maintenance power source.

A significant amount of kinetic energy is absorbed or transmitted through the roadway or bridge structure due to vehicles traversing the structure or by seismic or wind activity moving the structure. It is possible to capture some of this kinetic energy by utilizing piezoelectric materials which are strained during vehicle passage seismic activity, wind, or other events which impart energy of motion to the expansion joint. As an example of the availability of such energy for harvest by piezoelectric materials, piezoelectric fibers may be embedded within the tires of a vehicle to capture or "harvest" kinetic energy which can then be transformed and utilized within the vehicle. Using presently known means, this vehicle captured kinetic energy cannot be directly utilized for applications on a bridge, roadway or other structure. Further, designs that utilize piezoelectronics rely upon small amplitude material straining are best suited for vibration waveforms that are of long duration and high frequency. As such, piezoelectric based energy harvesting systems are impractical for the type of vibrations experienced by expansion joint systems.

Displacement driven energy generation refers to generators that utilize the relative displacements between components for energy generation, and do not rely upon material straining to produce energy. Displacement driven energy harvesting can be much more efficient than piezoelectric-based energy harvesting systems for the type of vibrations experienced by expansion joint systems.

Both piezoelectric and displacement driven energy harvesters have been proposed in attempts to capture the kinetic energy in water, which is manifested as waves and turbulence. Heretofore, however, it has not been known to incorporate energy harvesting, transforming and applying means within a bridge, roadway, or architectural structure expansion joint system.

Accordingly, it remains desirable in the art to provide means for harvesting kinetic energy within a bridge, roadway, or architectural structure expansion joint system, transforming the kinetic energy to electrical energy, and utilizing the electrical energy for structural health, safety and performance applications directly on the roadway, bridge, or architectural structure, and an expansion joint system incorporating a energy harvesting, transforming, and utilizing means. It is also desirable that the means for harvesting, transforming, and applying the energy be compact, environmentally durable, substantially maintenance free, and be able to withstand hundreds of millions of large amplitude displacement cycles. It is also desirable that the means should be able to effectively utilize expansion joint displacements, which are on the scale of a millimeter, high force, intermittent, and of moderate frequency.

SUMMARY

An expansion joint electrical energy generator is provided, said expansion joint electrical energy generator comprising an expansion joint component for capturing displacements having kinetic energy, an amplifier for amplifying said captured displacements; and an energy converter for converting the kinetic energy of said amplified displacements to electrical energy.

According to another embodiment, an expansion joint system including an electrical energy generator is provided, said expansion joint system for a roadway construction wherein a gap is defined between adjacent first and second roadway sections, said expansion joint system extending across said gap to permit vehicular traffic and comprises transversely extending, spaced-apart, vehicular load bearing members, elongated support members having opposite ends positioned below said transversely extending load bearing members and extending longitudinally across said expansion joint, and an electrical energy generator in connection with a component of said expansion joint system.

According to certain embodiments, said expansion joint electrical energy generator that is integrated with said expansion joint system comprises a component for capturing displacements having kinetic energy, an amplifier for amplifying said captured displacements; and an energy converter for converting the kinetic energy of said amplified displacements to electrical energy.

Also provided is a method for converting kinetic energy to electrical energy. This method comprises capturing from an expansion joint those displacements having kinetic energy, amplifying said displacements, and converting the kinetic energy of said amplified displacements into electrical energy.

BRIEF DESCRIPTION OF THE DRAWINGS

FIG. 12 shows the theoretical calculation of electrical energy generation by the EGM.

DETAILED DESCRIPTION

Provided are apparatus and process for the harvest, transformation, and subsequent application of energy contained in expansion joints, such as bridge and roadway expansion joints. The apparatus and process relate to harvesting of kinetic energy contained within a bridge, building, or roadway expansion joint due to vehicular impacts, seismic activity, wind, or other events which impart energy of motion to the expansion joint, the conversion of the harvested kinetic energy to electrical energy, and the subsequent application of the electrical energy.

An expansion joint electrical energy generator apparatus is provided. The expansion joint electrical energy generator works by capturing a portion of the kinetic energy of vehicular traffic or seismic or wind activity imparting motion to the expansion joint system and converting the captured kinetic energy to electrical energy. The system may also reformat the electrical energy to power components that may be utilized to improve the health, safety, and performance of the structure.

The energy conversion and delivery functions of the electrical energy generator occur with a functional apparatus referred to herein as an Electrical Generation Module ("EGM"), while the application of the energy occurs within a functional apparatus referred to herein as an Energy Application Module ("EAM").

Figure 1:
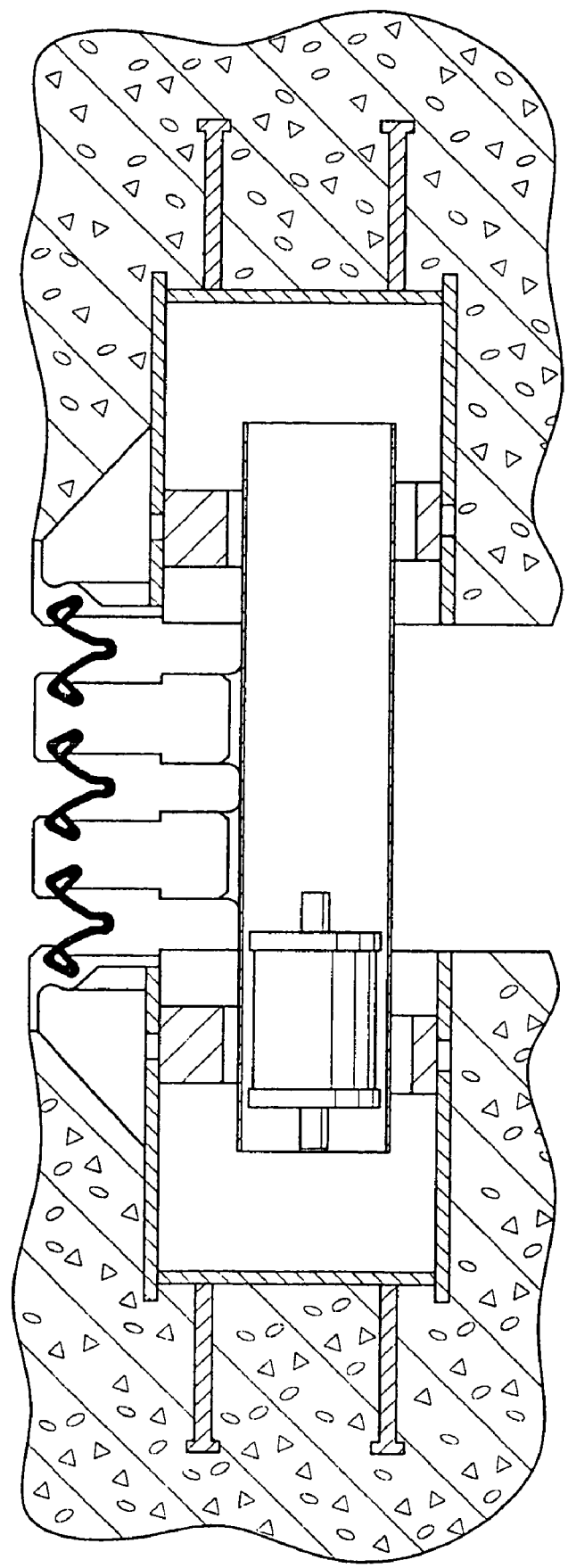
FIG. 1 is a cross sectional view representation of a known modular expansion joint system for bridge and roadway constructions.

FIG. 1 shows a known modular expansion joint system for bridge and roadway constructions. Impacts occurring between the steel members of the expansion joint system and vehicle tires, or impacts occurring due to other conditions, set elements of the expansion joint system into motion and said motions are transferred to the flexible expansion joint support bearings. The expansion joint support bearings compress in response to the application of a load and expand when unloaded.

Figure 2:
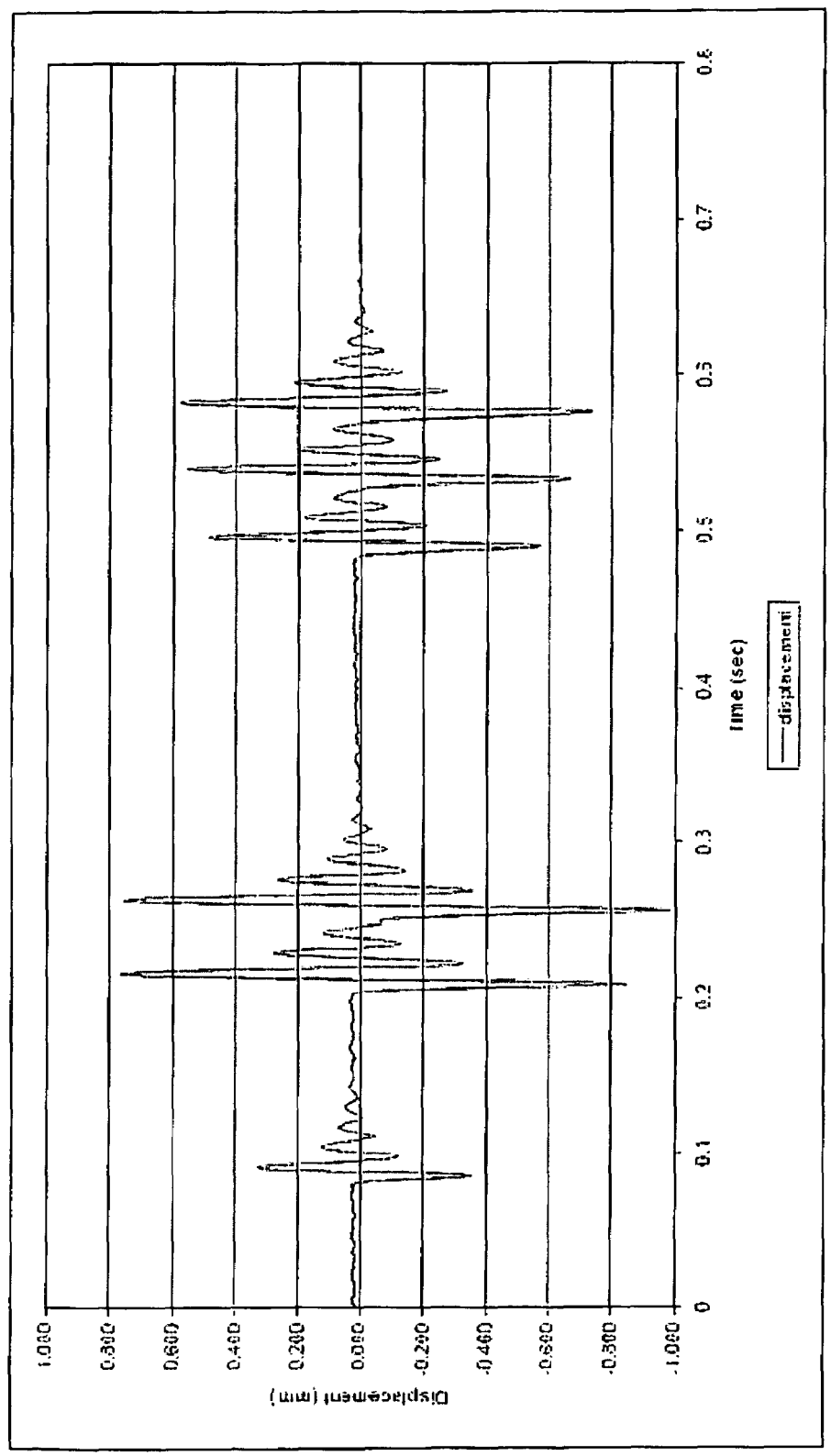
FIG. 2 is a graph of a time history trace of bridge expansion joint bearing displacement as a vehicle traverses the expansion joint system.

FIG. 2 shows a time history trace of bridge expansion joint structural bearings, which indicates that deflections from vehicles on the scale of 1 millimeter (mm) can be expected as a vehicle traverses the expansion joint system. Thus, the dimensional changes in the bridge expansion joint support bearings make them a good candidate for kinetic energy harvesting sites, that is, locations where kinetic energy from displacements can be converted into electrical energy.

According to one embodiment, an EGM can be integrated with a bridge expansion joint bearing. As dimensional changes in bridge expansion joint support bearings make them a good candidate for kinetic energy harvesting sites, the EGM is capable of capturing and converting displacements due to a vehicle load, seismic activity or wind that occur in a bridge or roadway expansion joint into electrical energy.

The expansion joint electrical generator includes means for capturing kinetic energy from vehicular impact energy or seismic or wind activity energy transmitted through the expansion joint, an amplifier for amplifying the captured kinetic energy, and an energy conversion apparatus for converting the captured kinetic energy to electrical energy. Note that the term "amplifying" as used herein refers to any modulating of the captured displacements by a multiplication factor. Where the multiplication factor is greater than one, the output displacement is greater than the input displacement. Where the multiplication factor is equal to or less than one, the output displacement is equal to or less than the input displacement. Note further that in applications where the multiplication factor is equal to one, the amplification step produces output equal to input; such an application functions identically to applications lacking an amplifier. According to certain embodiments, the expansion joint electrical generator includes an extended-element emanating from a component of an expansion joint system which is subject to displacement upon vehicular, seismic, or wind input, an amplifier connected to the extended element whereby the amplifier amplifies and transmits displacements from the extended element to an amplified displacement member, an energy conversion apparatus for converting the kinetic energy of the amplified displacement member to electrical energy, optionally, electrical circuitry to transform the electrical energy to a predetermined waveform, and, optionally, wiring to transmit the predetermined waveform to an application apparatus.

Figure 3:
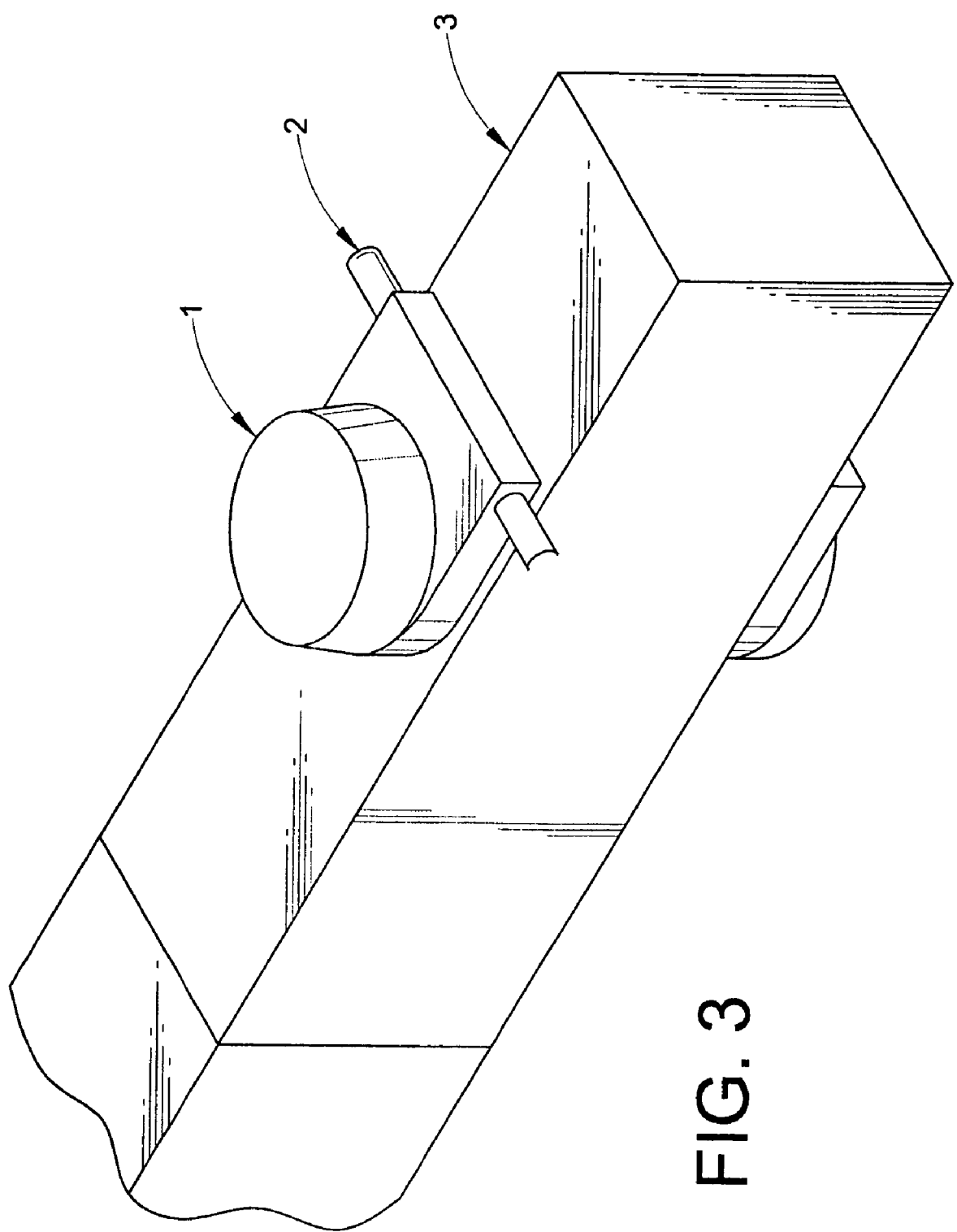
FIG. 3 shows a portion of an expansion joint system.
Figure 4:
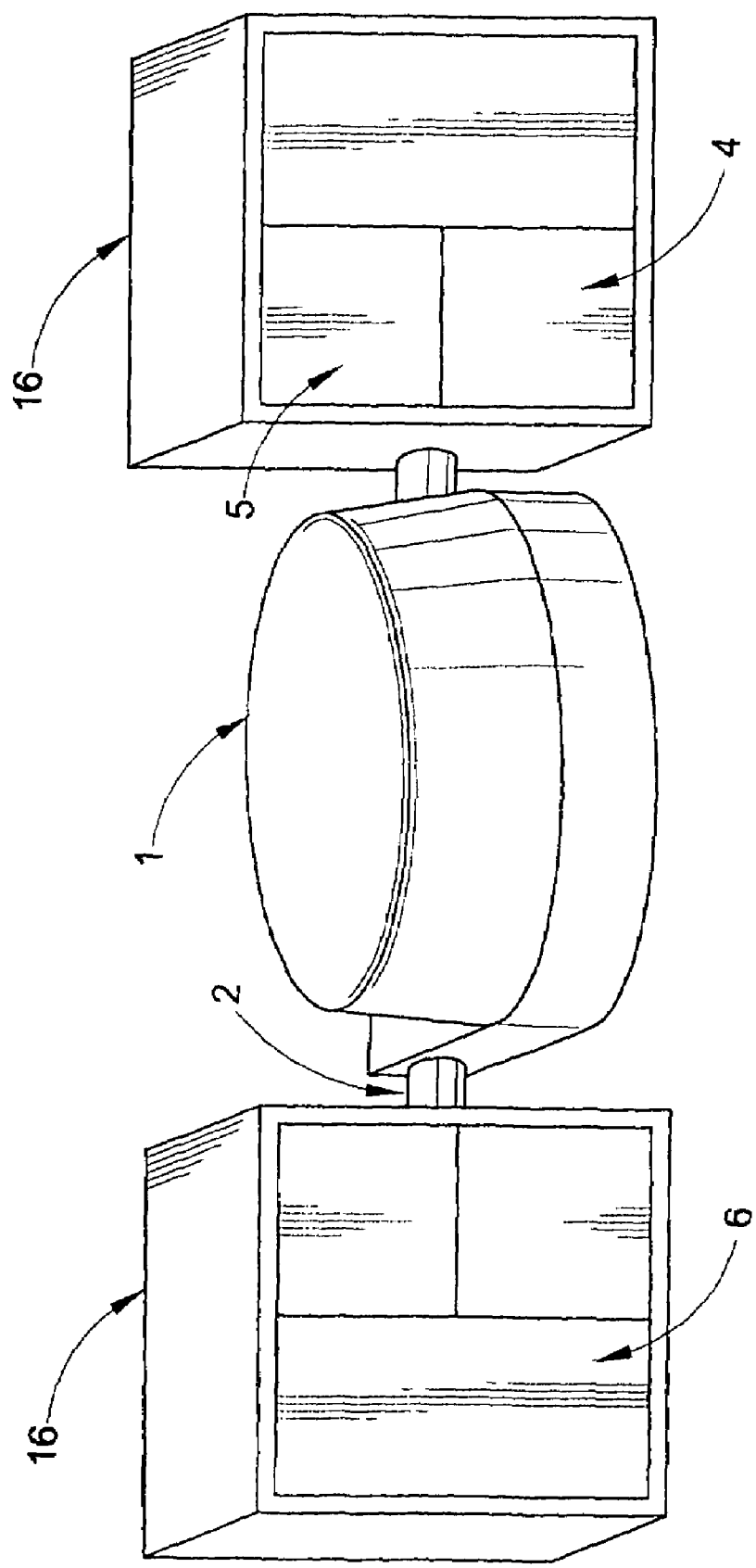
FIG. 4 shows an illustrative embodiment of an Electrical Generation Module ("EGM") integrated with a bridge expansion joint structural bearing in tandem with a second EGM similarly integrated.

Referring now to FIG. 3, an EGM 16 may be integrated with an expansion joint bearing 1 by means of a displacement capturing component. As shown in FIG. 3, the displacement capturing element is an elongated driver rod 2 that is integrated with the expansion joint bearing 1. According to the illustrative embodiment shown in FIG. 3, the expansion joint bearing is shown in combination with a support bar 3 that is typically utilized in modular expansion joint systems for roadways and bridges. As shown in FIG. 4, the end of the elongated driver rod 2 opposite the end that is attached to the expansion joint bearing 1 is integrated with the EGM 16.

According to FIG. 4, the EGM 16 includes a number of sections, each demarcated by function. The illustrative EGM structures shown in FIG. 4 include displacement amplification sections 4, electromagnetic sections 5, and optional electrical circuitry sections 6. According to certain embodiments, the displacement amplification section 4, electromagnetic section 5, and optional electrical circuitry section 6 of the EGM are located within a housing dedicated to protect the components from the environment and to facilitate accessibility to the components.

Figure 5:
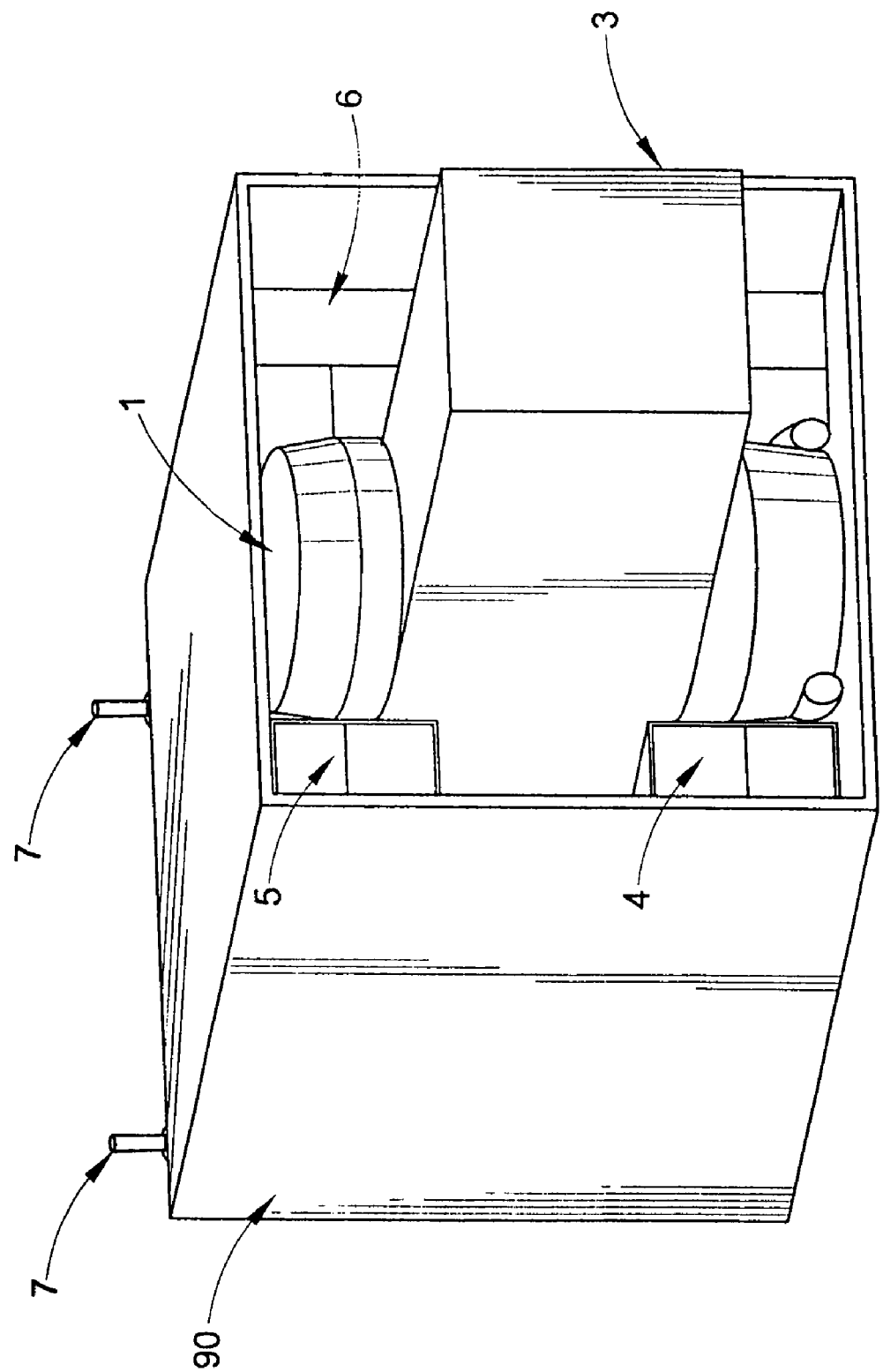
FIG. 5 shows an illustrative embodiment of a portion of a bridge expansion joint support box comprising an expansion joint support bar, expansion joint structural support bearings, and EGMs integrated with the support bearings.

According to other embodiments, as shown in FIG. 5, the displacement amplification section 4, electromagnetic section 5, and optional electrical circuitry section 6 of the EGM 16 may be housed within the housing 90 that also is adapted for insertion of the ends of the longitudinally extending support bars of the expansion joint system.

Figure 6:
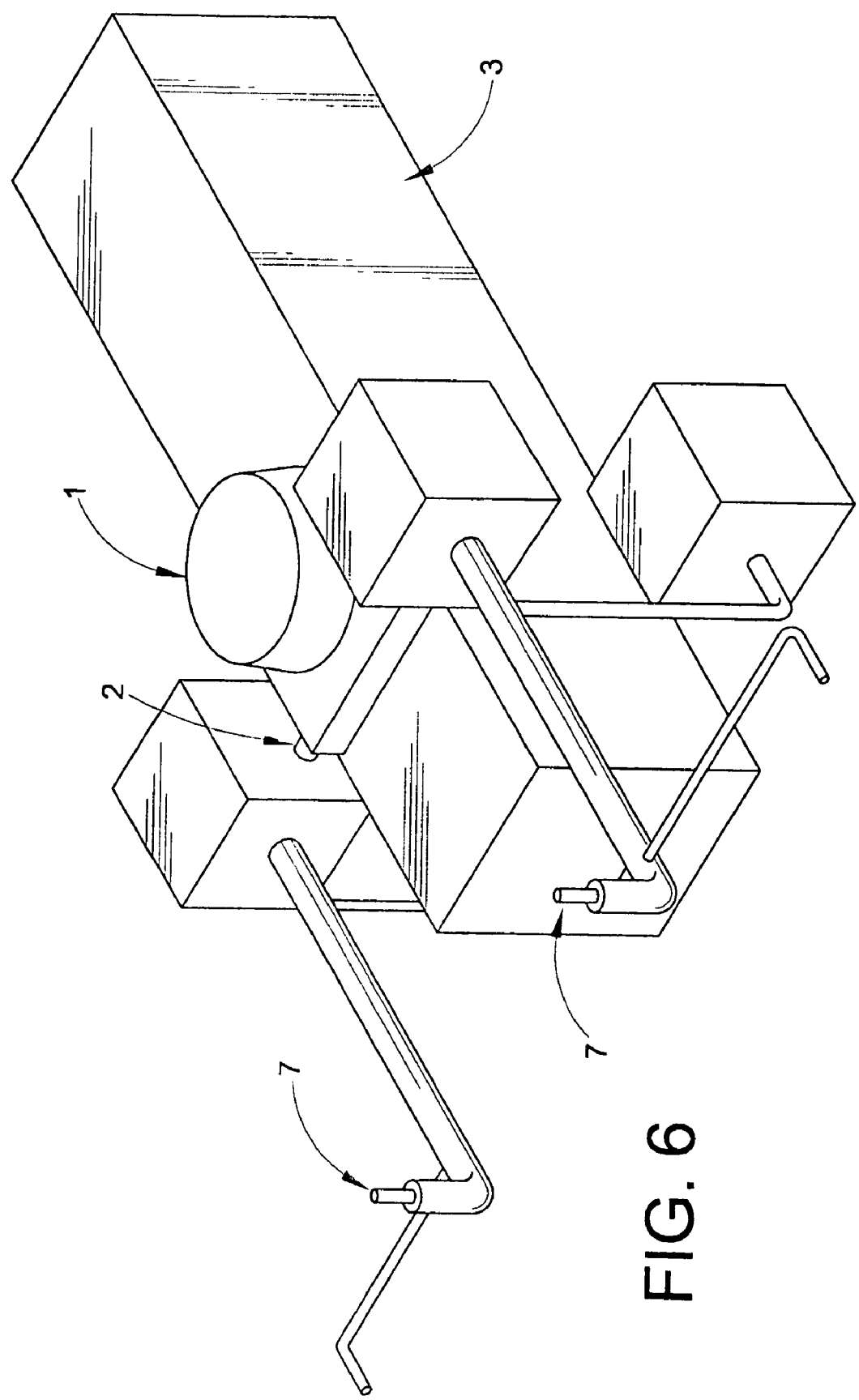
FIG. 6 shows an illustrative embodiment of a portion of a bridge expansion joint electrical energy generator having expansion joint support bar, expansion joint structural support bearings, EGMs incorporated with the support bearings, and means for transmitting the generated electrical energy from the EGM to an Electrical Application Module ("EAM").

After the kinetic energy of the displacement due to vehicle load, seismic or wind activity has been captured and converted to electrical energy by the EGM of the expansion joint system, the converted electrical energy can be disbursed for desired applications which benefit the health, safety, and performance of the bridge structure. Now referring to FIG. 6, an expansion joint bearing 1 is shown in combination with a support bar 3 typically utilized in modular expansion joint systems for roadways and bridge structures. Elongated driver rods 2 are attached to the expansion joint bearing 1 and the EGM. Means for transmitting electrical energy 7 generated by the EGMs to the EAM are also shown in FIG. 6. According to the embodiment of FIG. 6, the means for transmitting the electrical energy 7 generated by the EGMs to the EAM are electrically conductive wiring and conduit.

The EAM may include components to transfer generated electrical energy to application apparatus. The retrieval components of the EAM may include media and/or devices to transfer the electrical energy generated by the EGM to a desired structural health application. The retrieval components of the EAM may also include an intelligence associated with it. The intelligence that may be associated with the EAM includes, without limitation, electrical decision making circuitry. According to other embodiments, the retrieval components of the EAM may be non-intelligent, that is, the retrieval components of the EAM may be simply passive components such as electrically conductive wiring and conduit.

Figure 7:
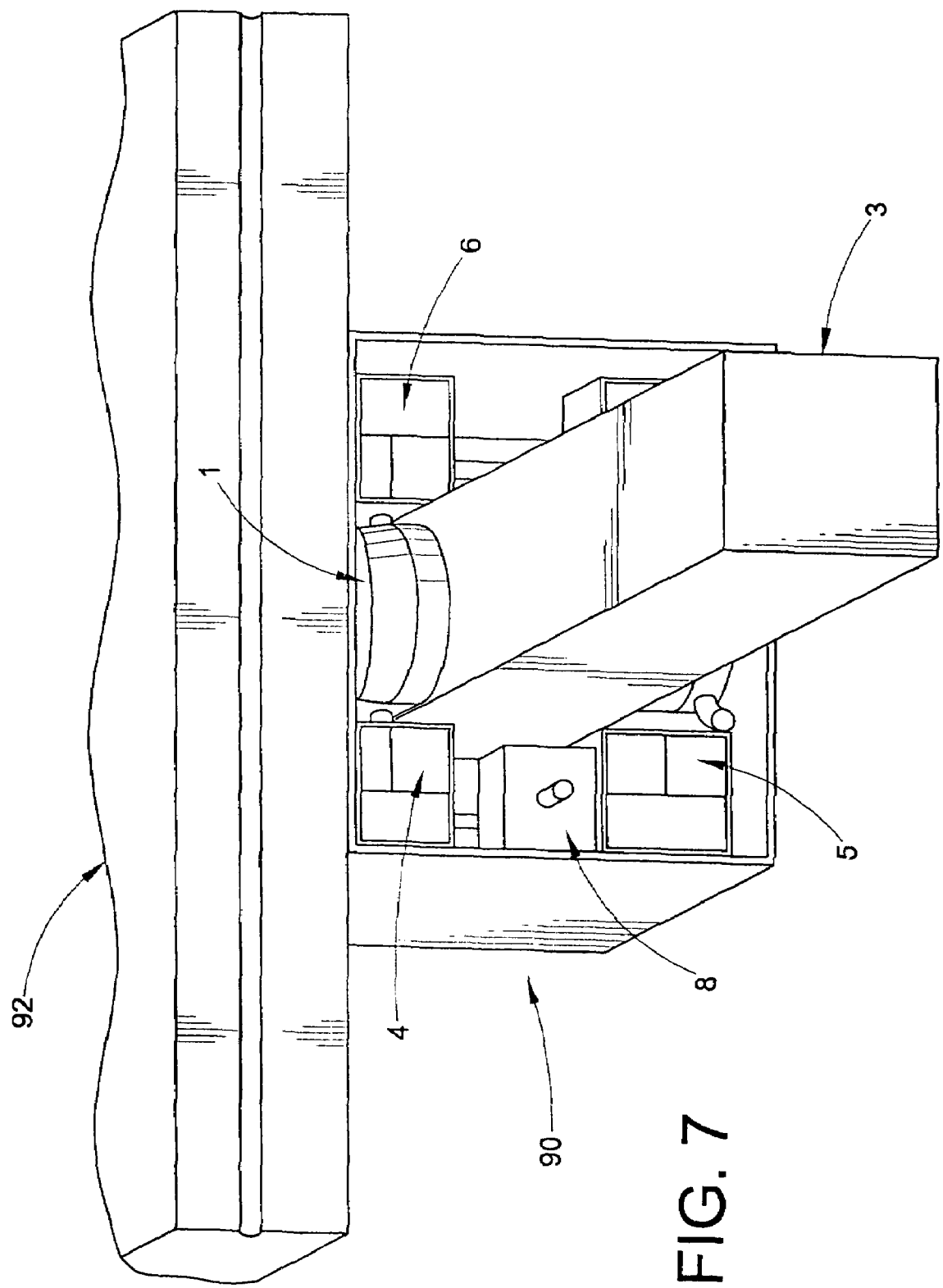
FIG. 7 shows an illustrative embodiment of a portion of a bridge expansion joint support box having an expansion joint support bar, expansion joint structural support bearings and EGMs incorporated with the support bearings, and an EAM in electrical connection with the EGMs.

FIG. 7 shows a EGM and EAM in combination with an illustrative application, namely, an electrical junction box 8 application. According to the embodiment shown in FIG. 7, the EGM captures the kinetic energy from displacements due to vehicle loads, seismic or wind activity, or other events which impart energy of motion and converts the kinetic energy to electrical energy. In certain embodiments, vehicle loads pass through a transverse loading member 92 before being passed to the rest of the system. The EAM is shown as including simply passive electrical retrieval and transmission components, namely, electrically conductive wiring and conduit. According to FIG. 7, kinetic energy from vehicular or other displacements is converted to electrical energy by the EGM. The EAM wiring components transmit electrical energy generated by the EGMs to electrical junction boxes. Thus, the expansion joint system provides a new source of power that had not heretofore been achieved in the bridge and roadway expansion joint art. The junction box 8 may be used to provide an electrical connection with the EAM to transmit electrical energy to a wide variety of low power health and safety applications, such as, acoustical recording devices, bearing heaters, and the like.

Figure 8:
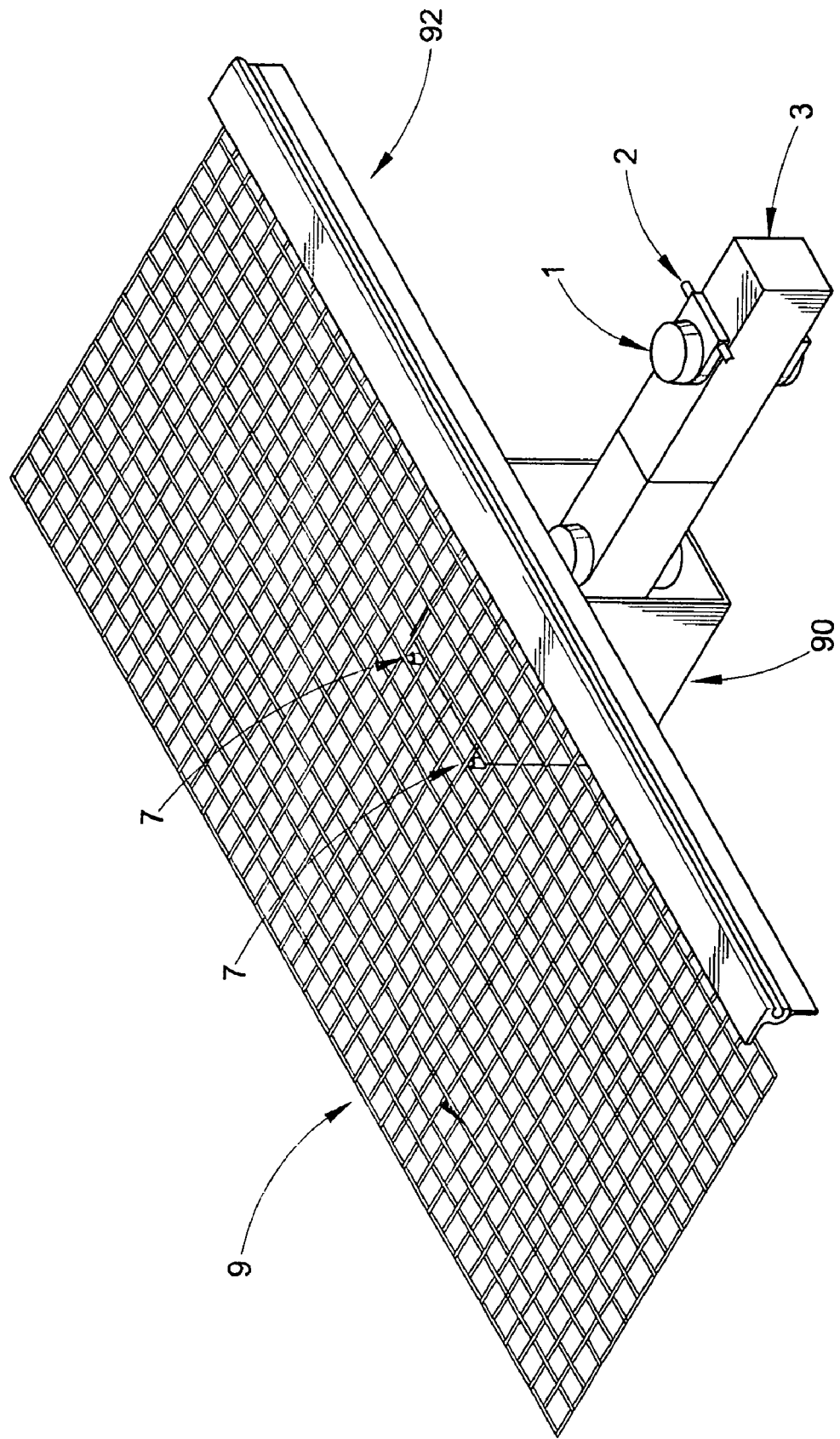
FIG. 8 shows another illustrative embodiment of the bridge expansion joint electrical energy generator including expansion joint structural support bearings incorporating EGMs and an EAM in electrical connection with the EGMs.

Now referring to FIG. 8, another embodiment of the expansion joint electrical energy generator is shown. This embodiment of the expansion joint system electrical energy generator integrates a cathodic protection system as the EAM. According to this embodiment, the cathodic protection system includes an anode mesh 9 that is in electrical connection with the EGM. The anode mesh 9 comprises a highly conductive material that reacts with the surrounding media that it is embedded within. Without limitation, the anode mesh 9 may comprise an electrically conductive titanium mesh material. The anode mesh 9 is positioned within the block out region of an expansion joint of a roadway or bridge. Concrete or an admixed material to promote electrochemical activity is introduced into the block out region of the expansion joint system and surrounds the anode mesh 9. Negative ions that are present in the media surrounding the anode mesh 9 are converted to electrons through the anode mesh, and are subsequently pumped via the electrical potential created by the EGM through the anode mesh 9 to a metallic region more cathodic to the anodic mesh 9 for corrosion protection. Target regions that are more cathodic to the anode mesh 9 include concrete steel reinforcement, pre-stressing strand anchorage, structural members, or even expansion joint components themselves. At the cathodic site, electrons participate in binding highly electronegative metal to mitigate oxidation of the metal, thereby resulting in decreased corrosion rates. Excess electrons at the cathodic sites react electrochemically in the media adjacent to the protected metal, completing the electrical circuit.

According to the embodiment of an expansion joint integrating an expansion joint cathodic protection system, an anodic mesh 9 is integrated with the expansion joint system. The anodic mesh 9 is surrounded with a media to structurally and electrochemically support the cathodic protection system. The anodic mesh is utilized as a means to extract negative ions present in the surrounding media and to convert the negative ions to electrons through electrochemical processes. The apparatus also includes metallic structural members as a means to receive and electrochemically convert the electrons to chemicals. Wiring and conduit provides an electron path between the power supply, the anodic mesh 9, and the metallic structural members of the expansion joint system.

Figure 9A:
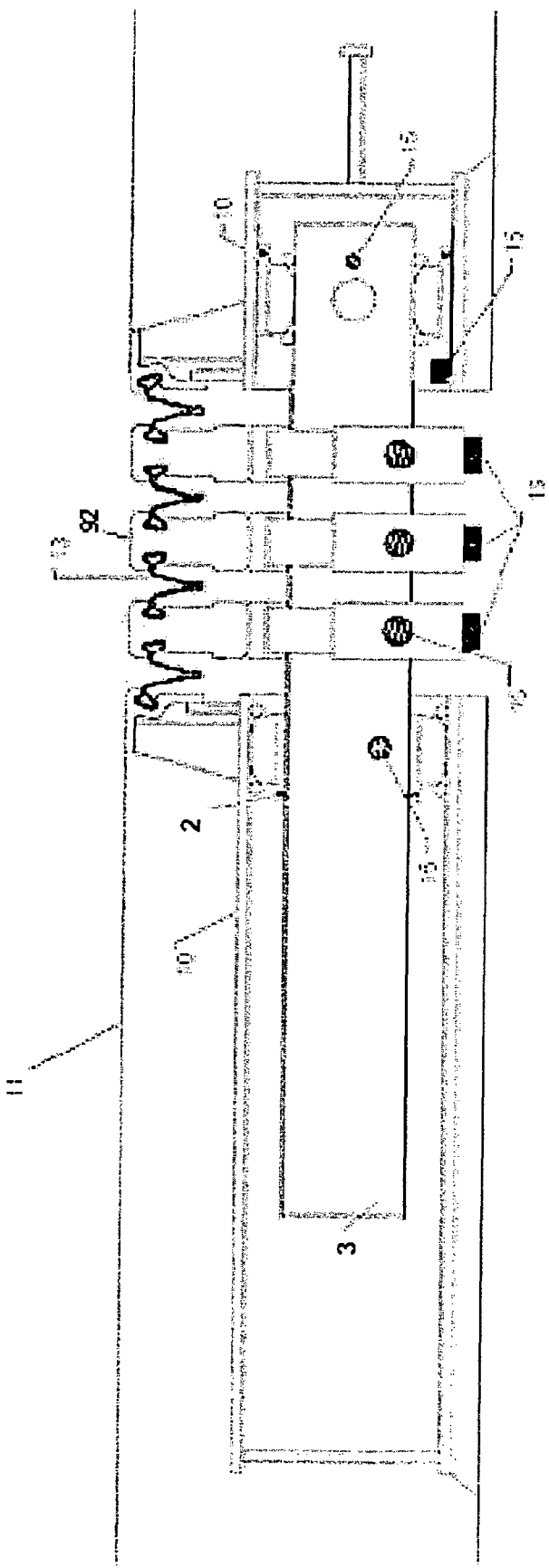
FIG. 9A is a side elevational view of another illustrative embodiment of an expansion joint system including an electrical energy generator (Not Shown) and data acquisition apparatus.
Figure 9B:
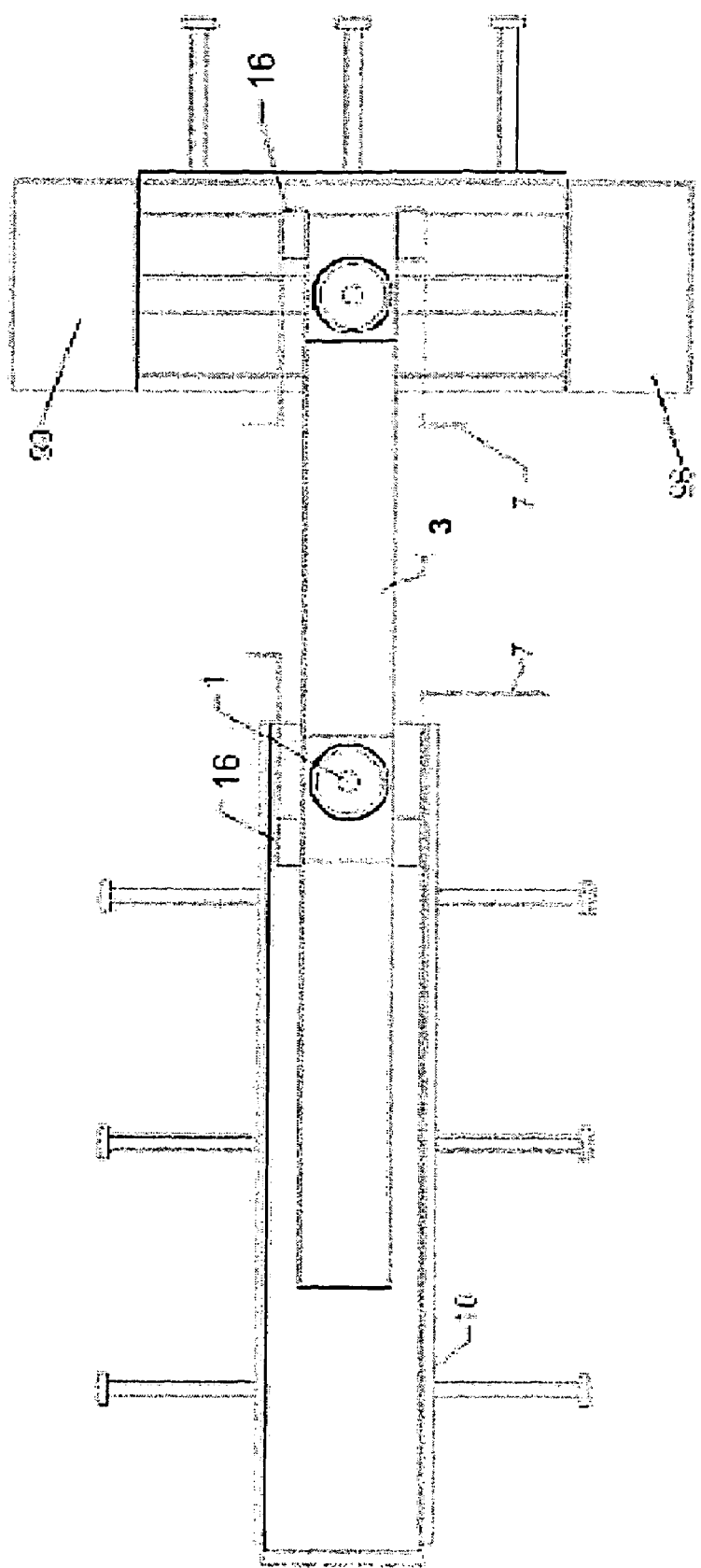
FIG. 9B is a plan view of another illustrative embodiment of an expansion joint system including an electrical energy generator (Not Shown) and data acquisition apparatus.

According to other embodiments, the expansion joint electrical generator incorporated in the expansion joint structure includes the EGM structure and an EAM in the form of a data acquisition system. According to FIGS. 9A and 9B, the EAM is provided as sensors 15 for monitoring and sensing a wide variety of roadway and bridge health and safety indices. The sensors may be strategically placed within the expansion joint system and/or bridge structure for information gathering functions, including for example, load monitoring, traffic counting, joint dynamic response, joint leakage detection, joint seal equidistance, and the like. FIG. 9A is an embodiment showing the position of the expansion joint with respect to the underlying concrete structure 11 and the connection between a transverse loading member 92 and the attached seal 13 or seals. FIG. 9A also shows identifies a support box 10 on each side of the expansion joint. FIG. 9B is an embodiment showing a utility box 96 for utility equipment including but not limited to wire routing, special sensors, and recorders. FIG. 9B also shows a data control center 99.

The sensors gather information regarding bridge health and performance, and transmit the gathered information electrically to a controller and storage unit. Any number of transmission vehicles may be used to transmit the gathered information from the sensors to the controller and storage unit, including hard wired transmission vehicles, wireless transmission vehicles, or combinations of hard wired and wireless transmission vehicles. Information from the controller/storage unit is, upon electrical summons, delivered to a client. Without limitation, the client may be an on-site computer or maintenance personnel uploading information onto a laptop computer.

According to the embodiment of an expansion joint system integrating an expansion joint data acquisition system, sensors may be positioned at strategically selected locations on components of the expansion joint system or on the bridge structure itself. The sensors are used as a means for converting characteristics of interest in the region of the expansion joint to electrical energy. The apparatus also includes wiring and conduit to transmit the electrical energy. A wide variety of sensors may be utilized. By way of illustration and without limitation, accelerometers, acoustic sensors, leakage sensors, or rotation sensors may be integrated with the expansion joint electrical energy generator.

It should be noted that the electrical energy generator is not limited to use with modular type expansion joint systems for roadways and bridges. To the contrary, it is possible to incorporate the electrical energy generator into a wide variety of expansion joint systems. By way of illustration, but not limitation, the electrical energy generator may be incorporated into expansion joint systems, such as plate joints, finger joints, and swivel joints. Further, it is possible to incorporate the electrical energy generator into any vibrating, oscillating, or movable mass in or on a bridge, roadway, or building to capture the kinetic energy therein.

Figure 10:
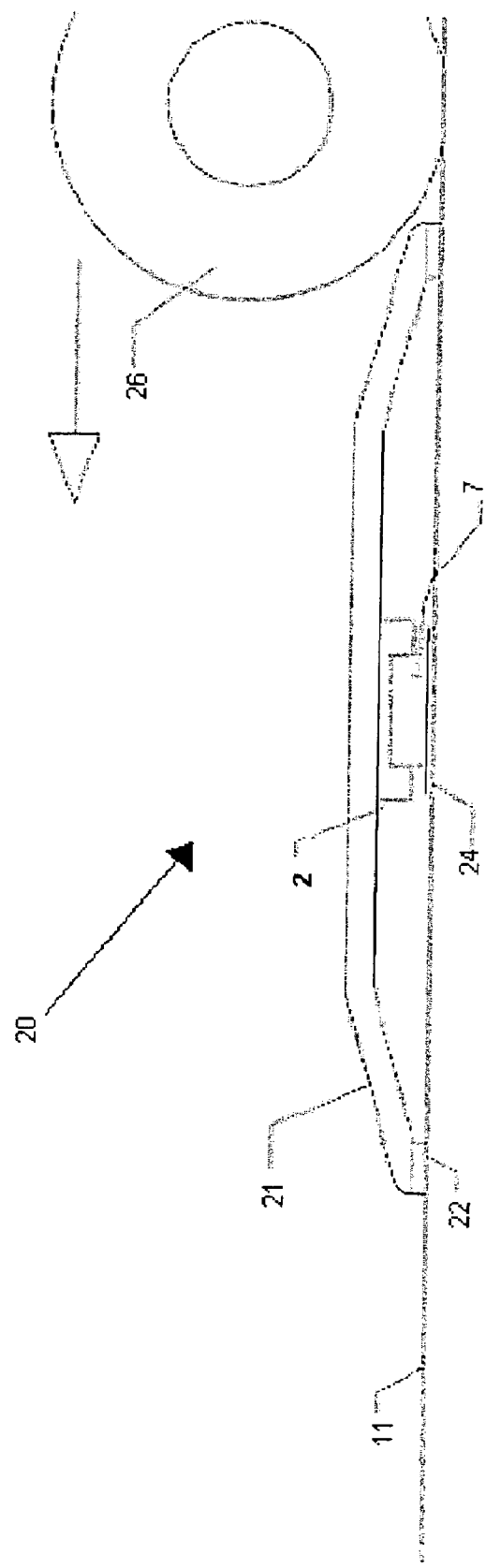
FIG. 10 is a side elevational view of an illustrative embodiment of a "pseudo-joint" expansion joint system integrating an electrical energy generator.

It may be desirable to utilize the EGM in combination with underlying structures that do not include functional expansion joints, or at locations remote from a functional expansion joint. One such application is shown in FIG. 10, which is referred to herein as a "pseudo-joint." As shown in FIG. 10, the pseudo-joint 20 does not include a gap cut through the underlying concrete structure 11 to permit relevant movement. According to this embodiment, the pseudo-joint 20 retains the basic structure of an expansion joint system and the EGM operates by the same principals as though it was integrated into a modular expansion joint system. In operation, a vehicle tire 26 passes over the steel plate 21 of the pseudo-joint 20. Kinetic energy from the vehicle impact is captured and the EGM converts the kinetic energy to electrical energy. An appropriate electrical junction is integrated with the EGM, therefore providing a power source.

Still referring to FIG. 10, the pseudo-joint includes a plate positioned over a section of roadway. Plate bearings 22 are positioned between the plate and the surface of the roadway. An EGM is positioned between the bottom surface of the plate and the roadway. The EGM is held in position by an anchoring means, such as an anchor plate 24. A driver rod 2 is in connection with the plate that is traversed by vehicular traffic and the EGM for transmitting kinetic energy from the plate member to the EGM. According to FIG. 10, electrically conductive wiring 7 is utilized to transmit the electrical energy generated by the EGM to the EAM apparatus.

Figure 11A:
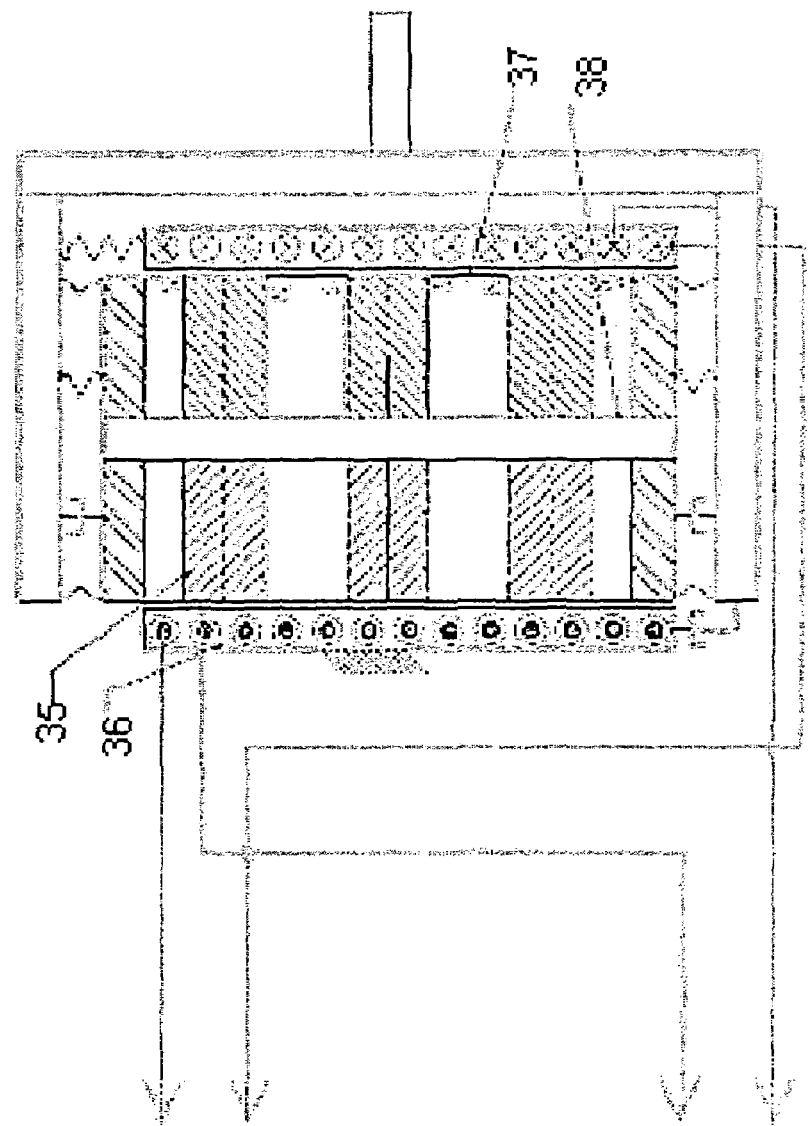
FIG. 11A shows schematic representations of certain embodiments of an electromechanical generator.
Figure 11B:
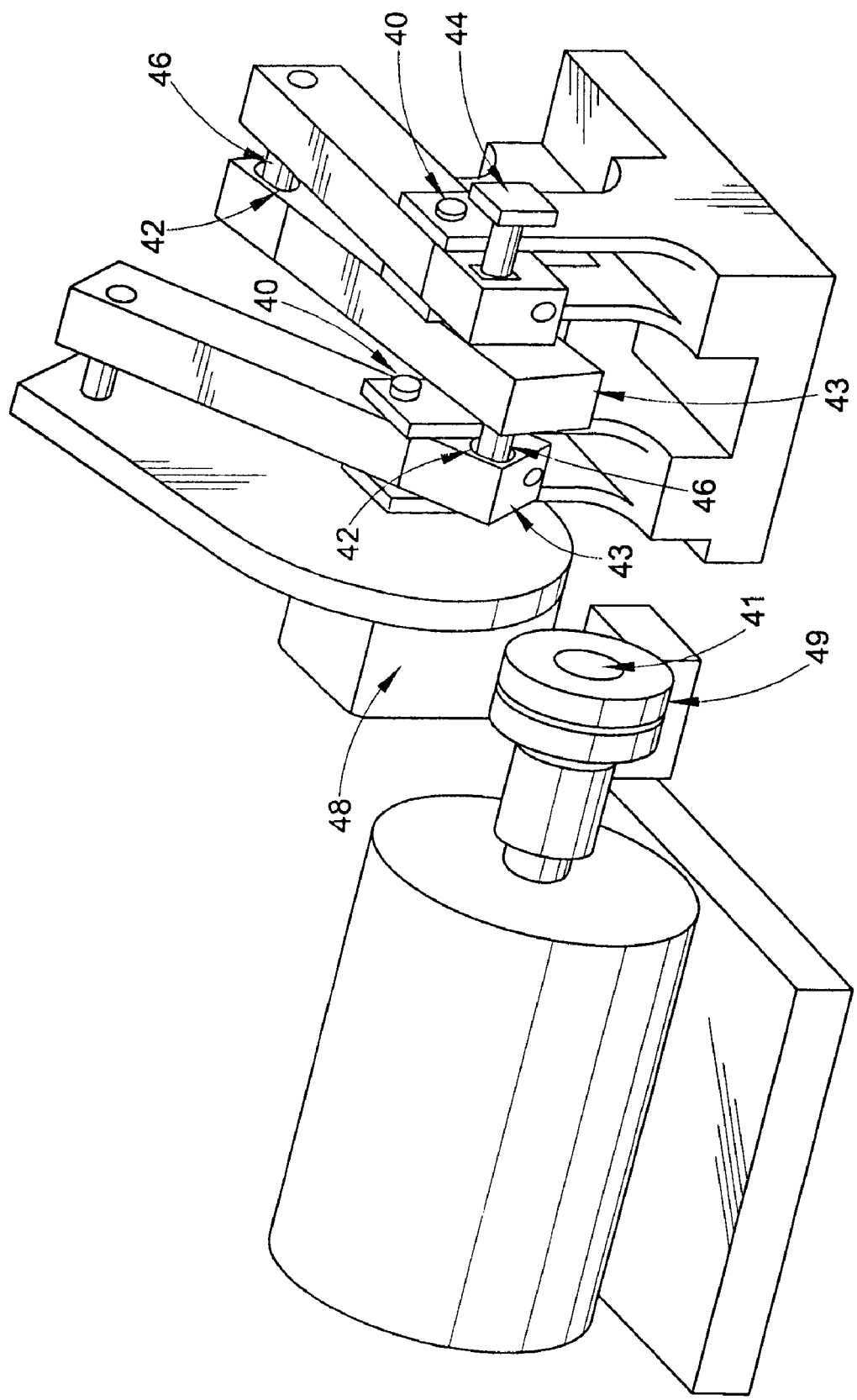
FIG. 11B is an isometric representation of a certain embodiment of a displacement amplifier structure of an EGM.

FIG. 11B shows an illustrative embodiment of the displacement amplification linkages of the EGM. Kinetic energy from vehicular impact or seismic or wind activity transmitted through the expansion joint are captured by the support bearings of the expansion joint and cause the driver rods to be displaced. The driver rods are linked to displacement amplification means, which amplify the displacements from the vehicular impacts. By way of illustration but not limitation, the displacement amplifier may be a lever, gears, a belt and pulleys, a slider-crank, a four bar mechanism, another mechanism, or any combination thereof which produces the desired ratio of output displacement to input displacement. In the embodiment shown the displacement amplifier is a set of concatenated slider cranks. The input displacement from the driver rod (not shown) is accepted by the displacement amplifier in an input region 44. Input displacement causes the link 43 to rotate about its axis of rotation 40. Such rotation displaces the opposite end of the link 43. In the intermediate links, there are output connectors 46 which connect to slots 42 in the next link in the connection. Such a connection allows output displacement in one link to be transferred to the next link as input displacement. The final link has an output surface 48, which engages rotary input surface 49 causing rotation of the output shaft 41. The output from axis 41 may then be fed as shaft work to a rotational generator. Displacement amplification linkages may be connected to the EGM, which converts the kinetic energy transmitted thereby to electrical energy.

In some embodiments, the energy conversion apparatus is an electromagnetic generator. An electromagnetic generator is any device which converts kinetic energy to electrical energy by moving one or more magnetic fields relative to one or more inductive elements so as to induce a current in at least one inductive element. By way of example but not limitation, common examples of electromagnetic generators include linear generators and rotational generators. Both linear and rotational generators are well-known to those or ordinary skill in the art and an appropriate type of generator may be selected for a given application without undue experimentation.

FIG. 11A shows another illustrative embodiment of a linear generator. A linear generator contains at least one magnet 37 which may reciprocate along a path, said path being surrounded by an inductive coil 36 or coils such that a current is induced in at least one coil by motion of the magnet. In certain embodiments, the EGM comprises a linear generator including an armature and a translator. The armature comprises a coil 36 including a plurality of turns of magnetic wire. According to one embodiment, each section of the coil may include six (6) loops (radially) by twenty (20) loops vertically. A winding resin may be used to secure the coil to an underlying scaffolding structure. The use of a winding resin also provides added insulation. Additionally, the use of the winding resin decreases coil failure rate due to vibrations, shock, and electrical surges. Without limitation, a useful winding resin that may be used is EPOXYLITE 234.

The translator includes an alternating stack of magnets and steel pole tips 35. The magnets are arranged such that their poles are opposed. This arrangement of the magnetic poles doubles the available flux. The magnets and pole tips are held together by a nonmagnetic rod 38. Without limitation, the magnets that could be used in the translator include neodymium iron boron magnets. These magnets are lightweight, and can be machined to any desired shape. A cylindrically-shaped magnet provided with a hole in the center may be used to permit the fitting the magnet over the nonmagnetic rod.

The steel pole tips are utilized to direct and transfer the generated flux. The steel pole tips may be manufactured from a soft iron material of low reluctance and high permeability. The steel pole tips may be machined to the same dimensions as the magnets. The steel pole tips may also be provided with a threaded inner diameter so that they will easily thread onto the shaft of the nonmagnetic rod.

A rotational generator contains a stator element and a rotor element which rotate, either freely or in a reciprocating manner, with respect to one another. In some embodiments and without limitation, a stator is an element fixed to a housing and the rotor is an element rotatably affixed proximate to the stator. The rotor and stator contain either an inductive coil or coils, an electromagnetic element or elements, a permanent magnet or magnets, or some combination thereof such that, when these components rotate with respect to one another, a current is induced in at least one coil. Such a generator may yield output electrical energy in AC or DC form. In certain embodiments, the EGM comprises a rotational generator.

Figure 11C:
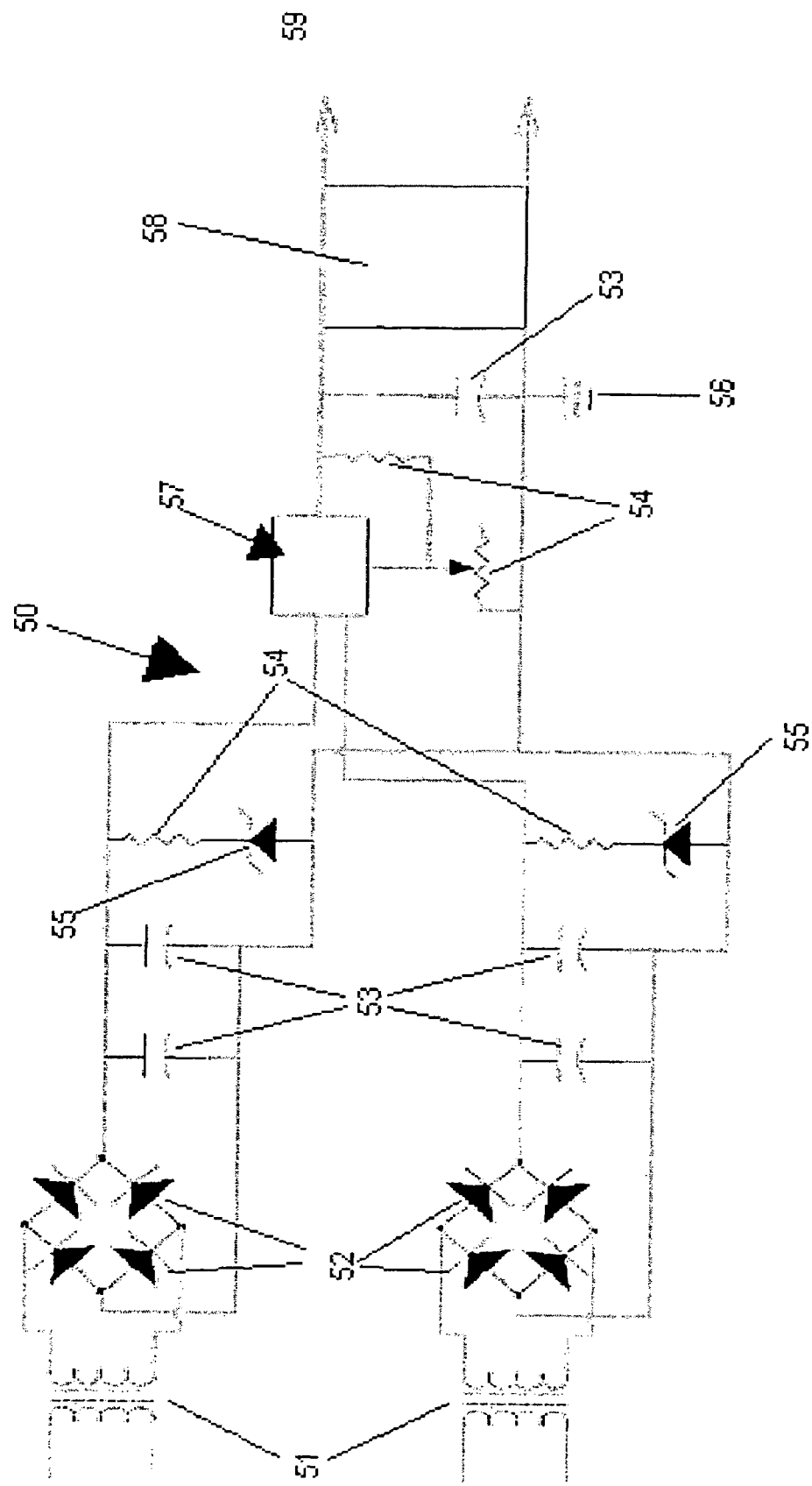
FIG. 11C shows a diagram of rectifier circuitry.

Some, but not all, applications will require the output electrical energy to be rectified. If such rectification is required, the apparatus may include means for electrical rectification of input energy, mechanical rectification of input energy, or both electrical and mechanical rectification of input energy.

Where electrical rectification is desirable, electrical energy generated by the electromagnetic generator is transmitted to a rectifier. FIG. 11C is an electrical circuit diagram which illustrates, without limitation, one kind of rectifier circuitry 50 portion that may be used in the electrical energy generator. The electrical circuitry includes transformers 51 to increase or decrease AC voltages, rectifier diodes 52 for converting alternating current (AC) to direct current (DC), capacitors 53 to store electrical charge, resistors 54 to resist the flow of the electrical charge, Zener diodes 55 to maintain a fixed voltage, and a ground connection 56. Optionally included in the rectifier circuitry 50 may be integrated circuitry 57, and EAM preparation circuitry 58.

Whether rectification is required or not, there may be some need to adjust the waveform output to conform to the requirements of the EAM apparatus 59. Processes for adjusting waveform are well known in the art, and may be selected by one having ordinary skill in the art without undue experimentation. Optionally, the output electrical energy is transmitted via electrically conductive wiring to the EAM apparatus 59.

Where mechanical rectification is desirable, the input displacement itself may be modified such that input only produces output mechanical work in the desired direction. By way of illustration but not limitation, displacement changed to oscillating shaft work input by mechanical means may be passed through a clutched transmission designed to pass work only during a selected half phase of oscillation, rotation in one of clockwise or counter-clockwise directions, and thus output a rectified half wave in the form of shaft work. This rectified mechanical work may then be input to a electromagnetic generator which outputs electrical energy in a similarly rectified form. Here again, whether rectification is required or not, there may be some need to adjust the waveform output to conform to the requirements of the EAM apparatus. As above, such waveform adjustments are known in the art, and may be selected by one having ordinary skill in the art without undue experimentation. Optionally, this output electrical energy may then be transmitted via electrically conductive wiring to the EAM apparatus.

The calculations present in FIG. 12 show that it is possible to capture kinetic energy from vehicular impacts or seismic or wind activity and to convert the captured kinetic energy to electrical energy, thereby generating milliwatts of power from the EGM over long periods of time.

According to other embodiments, an expansion joint incorporating an electrical generator is provided. The electrical generator may be incorporated into a modular type expansion joint system. The modular type expansion joint system is typically installed in the gap between adjacent sections of a concrete structure. The modular type expansion joint systems generally include a plurality of vehicular traffic loading bearing members that are adapted to extend transversely (relative to the direction of the flow of traffic) within an expansion joint, a plurality of support members that extend longitudinally (relative to the direction of the flow of traffic in the expansion joint across the gap), and support housings for accepting ends of the elongated support bar members. It should be noted, however, that the housings for accepting the ends of the support bar members may include any structure for example and without limitation, receptacles, chambers, containers, enclosures, channels, tracks, slots, grooves or passages, that includes a suitable cavity for accepting the end portions of the support bar members.

Provision may be made for particular types of movement of the support bars within the separate means for accepting the ends of the support members. In one embodiment, the housings for accepting the ends of the support members comprises a box-like receptacle. First housings for accepting the ends of the longitudinally extending elongated support members substantially restricts transverse movement of the support bar member within the housing, but permits longitudinal movement within the first housing. Second housings for accepting the ends of the longitudinally extending elongated support members substantially restricts longitudinal movement of the support member within said second housing for accepting, but permits transverse and vertical movement within the second means for accepting.

The housings for accepting the opposite ends of the support bar members of the expansion joint system also include support bearings to absorb vehicular impacts as vehicles travel across the expansion joint system and seismic or wind displacements as seismic or wind activity transmits energy to across the expansion joint system. Electrical generators (EGMs) are connected to the support bearings of the expansion joint via elements emanating from the support bearing, such as and without limitation, elongated driver rods.

The modular expansion joint systems may also include a mechanism for controlling the spacing between the transversely extending load bearing members. The means for controlling the spacing between the load bearing members maintains a substantially equal distance between the load bearing members in response to movement within the gap of the expansion joint.

Compressible seal members may be engaged with the transversely extending load bearing members within the expansion joint. The seals are generally flexible and compressible and, therefore, can stretch and contract in response to movement of the load bearing beams within the expansion joint. The seals are preferably made from a durable and abrasion resistant elastomeric material. The seal members are not limited to any particular type of seal. Suitable sealing members that can be used include, but are not limited to, strip seals, glandular seals, and membrane seals.

The use of the expansion joint system with an electrical energy generator substantially supplants the need for external batteries or other limited life galvanic cells to power expansion joint structural health, safety, and performance apparatus.

The use of the expansion joint system with an electrical energy generator also substantially eliminates the cost and expense of electrical harnessing and structural modifications from other power sources that may be currently available.

By integrating an electrical energy generator with an expansion joint system, a system that is capable of monitoring and improving the structure's overall health and safety through electrically powered applications is provided.

An expansion joint system that is capable of actively improving the structure's performance, for example to provide the safe passage of vehicles across the expansion joint system, through electrically powered applications is provided.

By incorporating an electrical energy generator with an expansion joint system, an expansion joint system that is integrated with structural health and safety applications is provided.

An expansion joint system that improves the health of the system by providing a power source electrical junction, such as a low amperage power source electrical junction, is provided. Consequently, a structural engineer is able to access the low amperage power source electrical junction for structural health applications.

An expansion joint system that improves the health of the structure through utilization of a self-powered active cathodic protection system is provided. The expansion joint system harvests kinetic energy from vehicular impacts, seismic or wind activity, converts the kinetic energy into electrical energy, and electrical energy is used to power the cathodic protection system that is integrated with the expansion joint system.

An expansion joint system that improves the health of the structure through utilization of a self-powered active data acquisition system is provided. The expansion joint system harvests kinetic energy from vehicular impacts, seismic or wind activity, converts the kinetic energy into electrical energy, and electrical energy is used to power the data acquisition system that is integrated with the expansion joint system. The self-powered data acquisition system collects structural health and performance information regarding the expansion joint system. By way of illustration and without limitation, such data acquisition system may include capabilities for recording peak events, recording short term time history, transmission of data to a roadside receiver or receivers, real time monitoring via the internet, recording information from other sensors, and otherwise gathering, recording, or transmitting structure information.

An expansion joint system that improves the health of the structure through utilization of an EAM comprising active or semi-active damping technology which affects the vibrational characteristics of the structure. By way of illustration but not limitation, such active or semi-active damping technology may include: dampers which have a damping factor that is a function of applied current, counter-excitation actuators, dampers which have a damping factor that is a function of flow through a controllable orifice, lock up devices, and dampers having very high damping factors. While such technology is useful in general for mitigating structural wear and fatigue, such technology is also of great value for mitigating structural harm from very high energy events such as earthquakes or high speed winds.

The use of the expansion joint system integrating an electrical energy generator provides an independent structural health application power source of such size, location, and reliability that it addresses the demands of a substantially maintenance free system operating in a real-time vehicular traffic environment.

While the present invention has been described above in connection with illustrative embodiments, as shown in the various figures, it is to be understood that other similar embodiments may be used or modifications and additions may be made to the described embodiments for performing the same function without deviating therefrom. Further, all embodiments disclosed are not necessarily in the alternative, as various embodiments may be combined to provide the desired characteristics. Variations can be made by one having ordinary skill in the art without departing from the spirit and scope of the invention. Therefore, the electrical energy generator and expansion joint incorporating the same should not be limited to any single embodiment, but rather construed in breadth and scope in accordance with the recitation of the attached claims.

We claim:

1. An expansion joint system comprising:
   at least one transversely extending vehicular load bearing member;
   elongated support members having opposite ends positioned below said at least one transversely extending vehicular load bearing member and extending longitudinally across said expansion joint; and
   an electrical energy generator comprising:
      means connected to a component of said expansion joint system for capturing displacements having kinetic energy;
      an amplifier for amplifying said captured displacements; and
      an energy converter for converting said kinetic energy of said amplified displacements to electrical energy.

2. The expansion joint system of claim 1, wherein said means for capturing displacements having kinetic energy is an elongated rod member.

3. The expansion joint system of claim 2, wherein said elongated rod member is connected to said amplifier.

4. The expansion joint system of claim 3, wherein said amplifier is connected to an amplified displacement member.

5. The expansion joint system of claim 4, wherein said amplified displacement member is connected to said energy converter.

6. The expansion joint system of claim 3, wherein said amplifier is selected from the group consisting of a lever, gears, a belt and pulleys, a slider-crank, a four bar mechanism, and combinations thereof.

7. The expansion joint system of claim 6, wherein said amplifier is a combination of slider-cranks.

8. The expansion joint system of claim 7, wherein said energy converter comprises an electromagnetic generator.

9. The expansion joint system of claim 8, further comprising electrical circuitry to transform said electrical energy to a predetermined waveform.

10. The expansion joint system of claim 9, further comprising means for transferring said predetermined waveform to an application apparatus.

11. The expansion joint system of claim 10, wherein said means for transferring said predetermined waveform to said application apparatus comprises electrically conductive wiring.

12. The expansion joint system of claim 11, wherein said application apparatus is selected from the group consisting of an electrical junction housing, an anodic mesh, and a data acquisition apparatus.

13. The expansion joint system of claim 1, wherein said expansion joint component is an expansion joint support bearing.

14. The expansion joint system of claim 1, wherein the expansion joint electrical energy generator is incorporated in an expansion joint system in a bridge, roadway, or architectural construction.

15. The expansion joint system of claim 1, wherein said generator is adapted for integration with an expansion joint system selected from the group consisting of modular expansion joints, finger type expansion joints, plate type expansion joints, and swivel type expansion joints.

16. An expansion joint system for roadway construction wherein a gap is defined between adjacent first and second roadway sections, said expansion joint system extending across said gap to permit vehicular traffic, said expansion joint system comprising:
   transversely extending, spaced-apart, vehicular load bearing members;

elongated support members having opposite ends positioned below said transversely extending vehicular load bearing members and extending longitudinally across said expansion joint; and an electrical energy generator in connection with a component of said expansion joint system.

17. The expansion joint system of claim 16, wherein said electrical energy generator comprises:

means connected to a component of an expansion joint system for capturing displacements having kinetic energy;

an amplifier for amplifying said captured displacements; and, an energy converter for converting said kinetic energy of said amplified displacements to electrical energy.

18. The expansion joint system of claim 16, wherein said means for capturing displacements having kinetic energy is an elongated rod member.

19. The expansion joint system of claim 18, wherein said elongated rod member is connected to said amplifier.

20. The expansion joint system of claim 19, wherein said amplifier is connected to an amplified displacement member.

21. The expansion joint system of claim 20, wherein said amplified displacement member is connected to said energy converter.

22. The expansion joint system of claim 19, wherein said amplifier is selected from the group consisting of a lever, gears, a belt and pulleys, a slider-crank, a four bar mechanism, and combinations thereof.

23. The expansion joint system of claim 22, wherein said amplifier is a combination of slider-cranks.

24. The expansion joint system of claim 23, wherein said energy converter comprises an electromagnetic generator.

25. The expansion joint system of claim 24, further comprising electrical circuitry to transform said electrical energy to a predetermined waveform.

26. The expansion joint system of claim 25, further comprising means for transferring said predetermined waveform to an application apparatus.

27. The expansion joint system of claim 26, wherein said means for transferring said predetermined waveform to said application apparatus comprises electrically conductive wiring.

28. The expansion joint system of claim 27, wherein said application apparatus is selected from the group consisting of an electrical junction housing, an anodic mesh, and a data acquisition apparatus.

29. A method for converting kinetic energy to electrical energy comprising:

capturing displacements having kinetic energy from an expansion joint system, wherein said expansion joint system comprises transversely extending, spaced-apart, vehicular load bearing members, elongated support members having opposite ends positioned below said transversely extending vehicular load bearing members and extending longitudinally across said expansion joint; and an electrical energy generator in connection with a component of said expansion joint system;

amplifying said displacements;

converting the kinetic energy of said amplified displacements into electrical energy; and optionally transmitting the electrical energy to an application apparatus.

* * * * *